United States Patent
Meek

(10) Patent No.: US 9,402,056 B2
(45) Date of Patent: Jul. 26, 2016

(54) COLLABORATION EXTENSION SYSTEM

(71) Applicant: ONE ROOM LIMITED, Auckland (NZ)

(72) Inventor: Craig Alexander Meek, Auckland (NZ)

(73) Assignee: One Room LTD, Auckland (NZ)

( * ) Notice: Subject to any disclaimer, the term of this patent is extended or adjusted under 35 U.S.C. 154(b) by 97 days.

(21) Appl. No.: 14/350,136

(22) PCT Filed: Oct. 5, 2012

(86) PCT No.: PCT/NZ2012/000180
§ 371 (c)(1),
(2) Date: Apr. 7, 2014

(87) PCT Pub. No.: WO2013/051952
PCT Pub. Date: Apr. 11, 2013

(65) Prior Publication Data
US 2015/0002618 A1    Jan. 1, 2015

(30) Foreign Application Priority Data
Oct. 7, 2011 (NZ) ......................... 595638

(51) Int. Cl.
H04N 7/14 (2006.01)
H04N 7/15 (2006.01)
H04L 29/06 (2006.01)

(52) U.S. Cl.
CPC .............. *H04N 7/152* (2013.01); *H04L 65/403* (2013.01); *H04L 65/80* (2013.01); *H04N 7/15* (2013.01)

(58) Field of Classification Search
CPC ...................................................... H04N 7/14
USPC ............... 348/14.01, 14.08, 14.09, 14.12
See application file for complete search history.

(56) References Cited

U.S. PATENT DOCUMENTS

| | | | | |
|---|---|---|---|---|
| 6,473,858 B1 * | 10/2002 | Shimomura | ........... | H04N 7/152 348/E7.056 |
| 6,937,266 B2 * | 8/2005 | Rui | ........................ | H04N 7/142 348/14.05 |
| 6,959,075 B2 * | 10/2005 | Cutaia | ............... | H04M 3/42221 370/260 |
| 8,693,648 B1 * | 4/2014 | Drugge | .................. | G06Q 50/01 348/14.08 |
| 9,001,178 B1 * | 4/2015 | Leske | .................... | H04N 7/155 348/14.08 |
| 9,203,968 B1 * | 12/2015 | Hwang | ................ | H04M 3/562 |
| 2004/0207724 A1 * | 10/2004 | Crouch | ............. | H04L 29/06027 348/14.09 |
| 2005/0010638 A1 | 1/2005 | Richardson et al. | | |
| 2005/0108328 A1 * | 5/2005 | Berkeland | ........... | H04L 12/1822 709/204 |

(Continued)

FOREIGN PATENT DOCUMENTS

EP     1 868 363     12/2007

OTHER PUBLICATIONS

International Search Report, PCT/2012/000180, Jan. 16, 2013.

*Primary Examiner* — Olisa Anwah
(74) *Attorney, Agent, or Firm* — Tsircou Law, P.C.

(57) ABSTRACT

A meeting management system for managing the conduct of a large meeting online provides the ability to split the online attendees into two classes, those who will actively take part in the meeting or videoconference and who will both receive and provide a video and audio stream, and those who will only receive a video and audio stream. The latter attendees will receive the stream from servers remote from the actual meeting manage system, possibly after the stream has been forwarded through several remote servers and has gained considerable latency. The latency will not be an issue as these attendees have no comparison with the live stream.

13 Claims, 3 Drawing Sheets

(56) References Cited

U.S. PATENT DOCUMENTS

| | | |
|---|---|---|
| 2008/0215680 A1 | 9/2008 | Salesky et al. |
| 2009/0015659 A1* | 1/2009 | Choi ............... H04N 7/152 348/14.09 |
| 2009/0019374 A1 | 1/2009 | Logan et al. |
| 2011/0267419 A1* | 11/2011 | Quinn ............... H04N 7/15 348/14.08 |
| 2011/0276880 A1* | 11/2011 | Greenfield ....... H04N 21/26616 715/720 |

\* cited by examiner

COLLABORATION EXTENSION SYSTEM

TECHNICAL FIELD

The invention generally relates to a public collaboration system and in particular to video conferencing systems and methods of extending such systems.

More particularly the invention relates to video conferencing systems with a large number of participants where a management system is provided to prioritise the progress of the conference and regulate interaction with the participants. Examples of this include internet seminars or meetings also know as "webinars", on-line concerts, corporate meetings, lectures, and seminars over the internet or fixed lines, and any form of video conference over the internet or over dedicated lines or private networks which may involve the interaction of two or more persons.

BACKGROUND ART

Video conferencing systems are known in which an icon or thumbnail image of each of the participants is provided on a conferencing screen. Typically such icons are arranged in no particular order (for instance in order of joining the conference) which can make it difficult for a conference organiser to identify the next presenter or to change the presentation order.

This identification and prioritisation task can become much more difficult where the conference is a constituted meeting of many persons, for instance the AGM of a large distributed company. The mere placing on screen of the icons of those joining the meeting may require more screen space than is available, resulting in the exclusion of some icons from the screen. The problem of identifying a participant wishing to speak and organising them into the speaking order provides additional problems of advising each person who is already in the speaking order of any changes and keeping participants aware of any changes in the meeting process.

Further, there is a problem in joining a large number of persons into a video conference. While there is a single video feed supplied in general to all participants the actual source of this feed may be any one of the participants, and the complications of providing the bandwidth and signal processing of a sufficiently high standard to ensure full evidential quality recording of video and audio at a central server from all of the participants is such that the number of participants must be limited. Typically the limitation is from 30 to 80 participants, depending on the hardware and connection resources available.

The limitations largely arise because each incoming audio and video signal requires at least some processing before it can be merged into a common video and audio feed. Additional processing is required for supplementary signal treatment, such as removing a single participant's audio from the return feed to avoid echo and feedback problems.

While compression techniques and signal processing techniques are improving the extension of video conferencing to a very large number of remote attendees for a particular conference is currently not a realistic option, nevertheless there are conferences or meetings which have several thousand attendees and allowing these to be carried out as video conferences is a desirable aim.

Known systems go some way towards solving these problems. Among these are:

Adobe Connect® which provides central servers streaming video and audio to participants both local and remote. Remote participants may be served through remote servers working from forwarded "chunked" data which also return chunked data to the central servers. This tends to provide erratic performance for a remote active participant.

Infinite Web Conferencing which provides a cloud based solution to a specified 1000 participants allowing any of these to participate in a meeting.

Similar technology is proposed in U.S. application 2006/0168553 which discloses an Instant Messaging solution providing virtual channels between multiple users.

Neither of these technologies appear to solve the problem of connecting a very large number of persons to a meeting so that any one of them may actively participate in the meeting because edge to edge latency of the "cloud" typically places an upper limit on how many users may be interconnected at the edges of the cloud and still interact understandably with the remainder of the participants.

Therefore a need exists for a solution to the problem of creating a video conference between a large number of persons where each of the persons may optionally take part in the conference within the bounds of existing technologies.

The present invention provides a solution to this and other problems which offers advantages over the prior art or which will at least provide the public with a useful choice.

To this end it is an object of the invention to provide a method of presenting to a large number of meeting attendees a streamed session of meeting occurrences and allowing at least some of the attendees to provide input to the meeting.

The terms "meeting" and "conference" are used interchangeably within the specification with the inference that a "meeting" may be formally structured and recorded while a "conference" may not be.

The term "live stream" means the meeting feed of video and audio proceedings produced as the meeting output and issued as directly as possible.

The term "delayed stream" means a replicated version of the live stream, delayed by a time which is perceptible in a comparison of live and delayed streams.

The term "attendee" means a person who is receiving the live or delayed streams of the meeting.

The term "participant" means a person who can provide input to the meeting without appreciable delay. In practice this can only be an attendee who is receiving a live stream.

The terms "forwarded stream" and "replicated stream" are synonymous. Either infers that the stream is delayed with respect to a live stream.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein; this reference does not constitute an admission that any of these documents form part of the common general knowledge in the art, in New Zealand or in any other country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

SUMMARY OF THE INVENTION

In one exemplification the invention consists in a method of presenting a video conference to remote attendees by:

providing to at least one remote attendee either a live or a delayed stream of the same video conference content;

providing to any remote attendee receiving a live stream the ability to participate in providing content for the live stream of the video conference;

providing to any remote attendee receiving a delayed stream of the video conference the ability to be allocated or request a live stream;

receiving from an attendee a request to provide a live stream to a remote attendee;

providing a live stream to such a remote attendee;

receiving from an attendee a request to provide content for the live stream of the video conference to an attendee receiving the live stream;

providing the ability to participate in providing content to the live stream to an attendee receiving the live stream as a result of the request to provide content for the live stream.

Preferably both the live stream and the delayed stream have a latency time from issue to receipt at an attendee and the latency time of the live stream to and from the participants in the live stream is sufficiently low that the progress of the videoconference is not impaired by such participants.

Preferably the signal stream of the videoconference to those remote attendees who are not participating in the live stream is replicated through at least one stream server remote from the live stream server for transmission to those remote attendees.

Preferably the signal stream from a remote stream server is forwarded to at least one other stream server for transmission to further remote attendees, Preferably at each stream server the delayed signal stream is cumulated for a time sufficient to ensure receipt of a sequential portion of the stream before the portion of the stream is again forwarded.

Preferably an attendee participating in a live stream may be removed from a live stream and connected to a delayed stream.

Preferably an attendee receiving a delayed stream may signal to a videoconference moderator by means outside the live stream a desire to participate in the live stream.

A further exemplification of the invention relate to a videoconference or meeting collaboration system having:

a server or servers providing a live output stream of the meeting proceedings;

a server or servers providing a delayed replicated stream of the meeting proceedings;

attendees receiving at least one of the streams;

at least one attendee receiving the live stream who is also a participant in creating the live stream;

an attendee request receiver receiving requests from attendees;

the request receiver on receiving a request from an attendee receiving a delayed replicated stream providing to the attendee a live stream;

a live stream request receiver receiving requests from an attendee receiving a live stream and either:

allowing an attendee receiving a live stream to become a participant in creating the live stream, or providing a delayed replicated stream to an attendee and removing any ability of the attendee to participate in creating the live stream.

Preferably a delayed replicated stream is provided to a server to provide a further delayed replicated stream.

Preferably the attendee request receiver processes a request from an attendee to become a participant in accord with a set of rules.

These and other features of as well as advantages which characterise the present invention will be apparent upon reading of the following detailed description and review of the associated drawings.

DESCRIPTION OF THE INVENTION

Figure 1:
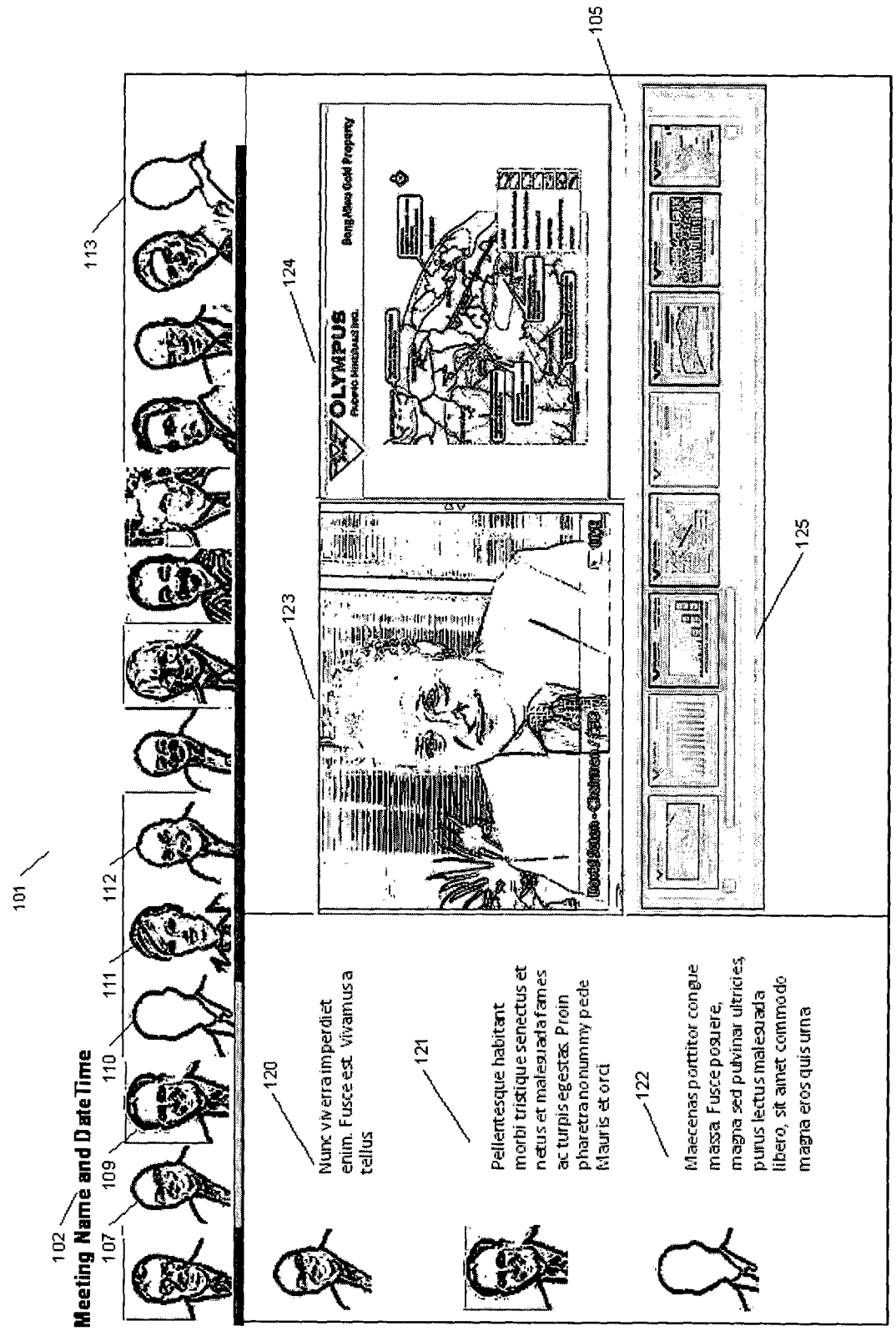
FIG. 1 is a diagram of the moderator screen of a video conference showing interaction with the meeting and with persons querying the meeting moderator.

The invention proposes establishing a list of persons who may attend or wish to attend a video conference or meeting, establishing which of those persons is certain or likely to collaborate in or have input to the conference or meeting and providing to those persons from a central collation server a full two way streaming connection of the conference or meeting up to the number of connections allowable. The connection limit is set by the collating server which may be known as a Multipoint Control Unit (MCU) server which bridges the signal from each input to every other input point, thus requiring control of a large number of channels. Each channel may require individual treatment, for instance to reduce the feedback to a person speaking of the sound of their own voice.

It is not practical currently to expand the hardware because of the number of interconnections required. Software solutions allow the use of cloud computing to set up numerous nodes and virtual connections between them which can operate at the latency involved and still provide a greater number of multi-point connections than hardware. However even using such techniques the number of multi-point channels is still eventually limited by the edge to edge latency of the cloud coupled with the total available bandwidth of the virtual connections between nodes. This requires that the number of directly connected participants is limited.

The list of persons who require input to a meeting or conference and who will therefore have voice and video input access to the proceedings may be established prior to the meeting by a request system and an identifier allocation which will identify the person when they log in to the meeting. Alternatively the connection with video access may be by request during the meeting with connections allocated by a meeting host or other priority system.

People who do not consider that they have any valuable input to the conference or meeting will be scheduled to receive a replicated streaming output from a secondary server fed with the combined stream from the collation server or MCU. The number of persons who can be supplied with such a forwarded video feed from a single server is considerably greater than that achievable by an MCU but may normally be bandwidth limited at about 75 separately directed video feeds. Each of these forwarded feeds may equally act as the input to a further replicating expansion server thus providing 7,000 separate feeds with a further forwarding expansion yielding 420,000 possible viewers.

Since the latency time from the collation server will increase with each additional level of server feeds in the chain, because of the need to ensure that a received stream is intact before transmitting it onwards, the received signal for those receiving the streaming output will be noticeably later than that received by those using the multi-point connections where the latency is only that from the MUC or nearest node. Furthermore the latency for a forwarded stream will increase at each step in the chain such that a person at the outer edge of the forwarded stream may be receiving a stream up to a minute later than its origin.

This degree of delay is not critical so long as the person does not have live interaction with the meeting. If the person does require to join the multipoint meeting feed then there will be part of the meeting proceedings which will be dropped during a transfer from a heavily delayed forwarded feed to a comparatively live feed. Similarly a person moving from live feed to delayed feed will see part of the meeting again.

FIG. 1 shows the moderator screen of a video conference or meeting during interaction with participants wishing to speak or otherwise bring the moderators attention to some point. Window 104 contains icons of the participant sending the moderator messages 120, 121, 122. The moderator may select each message and respond to it, or may take some other action, such as placing the participant in the speaking list, adding an explanatory note to the meeting process, adding a document to the meeting documents, or similar actions.

Window 105 now shows the current meeting presentation which appears for every participant, with a video window 123 showing the current speaker, together with their position and links accessing other information relevant to the presenter. At 124 appears the document which the presenter is currently speaking to, while window 125 shows all the documents relating to the meeting and which can be displayed in window 124 as the presenter wishes. The presenter can add documents, reports, video clips, web links, etc to the documents appearing in window 125 as the meeting progresses, these being transferred to the data store and indexed as they are added.

Moderators may have additional controls to eject or bar persons from the meeting, or indeed to suspend them as a registered user.

The workflow required to provide the functionality necessary to receive input from and send the meeting proceedings to the people "attending" the meeting is described in the applicants pending patent application and relies on the ability of an MCU to receive the various feeds which make up the meeting and resolve them into one or more streams of meeting information at least one of which will include live video of the current presenter and live audio of the presenter as well as video and audio of any person currently interacting with the presenter.

Intensive processing is required in order to produce these streams and this is normally a function of a centralised MCU which bridges the various incoming feeds into one or more outgoing streams. Because of the need to maintain the meeting or conference interaction at a level normal for a live meeting it is necessary that an interaction between the two attendees who have the greatest separation in terms of the latency time can still interact in a time which is within that normally encountered. This may typically be about a second.

In this time it is required to receive a feed from a person at an edge of the maximum latency time acceptable, merge this into the live stream from the MCU and then transmit the live stream to the location of a person also at an edge of the maximum acceptable latency. The processing and signal transfer time required to do this sets limits on the maximum number of persons who can be "live" attendees at a videoconference. To allow a greater number of persons to participate in the videoconference it is proposed to provide only the available number of "live" attendees and to forward to the remainder a delayed stream having the same content as the "live" feed but disseminated through a simple server repeater chain. The "passive" attendees receiving this forwarded stream will be unable to contribute "live" to the videoconference, although they may have logged in to the conference just as those receiving the live feed will have.

Instead the passive attendees will receive only a forwarded stream which is not required to have a particular latency. This latter allows the forwarded stream to be reconstituted at remote servers and again sent on to more passive attendees or even more remote servers. Typically, because the forwarded stream may not have a high Quality of Service (QoS) the time required to ensure that a remote server has fully received a sequential portion of the forwarded stream before sending it out again may be in the order of 10 to 20 seconds. It can be seen that a passive attendee at the end of a chain of remote servers may be viewing a forwarded stream which could be up to a minute behind the live stream. This is of no particular significance so long as the passive attendee has no comparison with the live feed.

Figure 2:
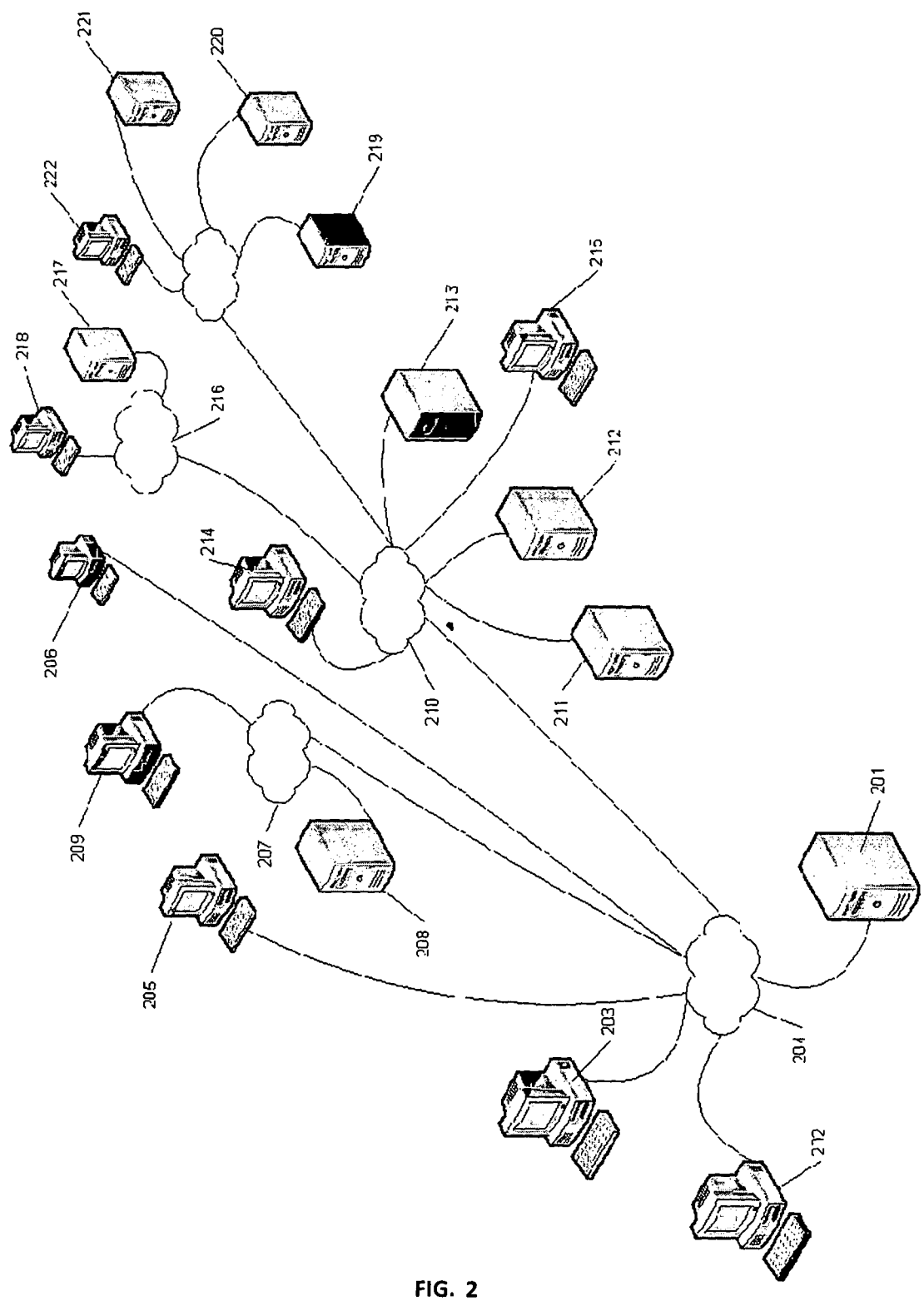
FIG. 2 is a diagram of the connection of a collation server and stream replicating servers.

FIG. 2 shows at 201 a data centre including an MCU, data store, and the other interfaces required to create a videoconference control centre. Connected to the control centre via the internet 204 are "live" attendee computers at 202, 203, 205 and 206. The live attendees are varying distances away from the control centre and the latency is that typically found on the internet, varying from 2 ms to 500 ms. The number of these live attendees is limited by the MCU capacity.

Derived from the MCU is a stream of the videoconference as a whole which is fed into the internet 204. This feed may be directed to remote servers 208, 211, 212, 213 to which passive attendees 209, 214 may connect. Typically each remote server may serve 75 attendees and may also forward a stream to further servers 217, 219, 220, 221 at more remote destinations where the servers may serve passive attendees such as 218, 222. The remote servers are at separated geographical locations and the connection of the passive attendee to the closest server is managed automatically in known manner.

In this way a passive attendee will receive a forwarded delayed stream from the nearest remote server, and the stream will be delayed appreciably from the live stream depending on how many times the forwarded stream has been reconstituted in its path to the passive attendee.

Figure 3:
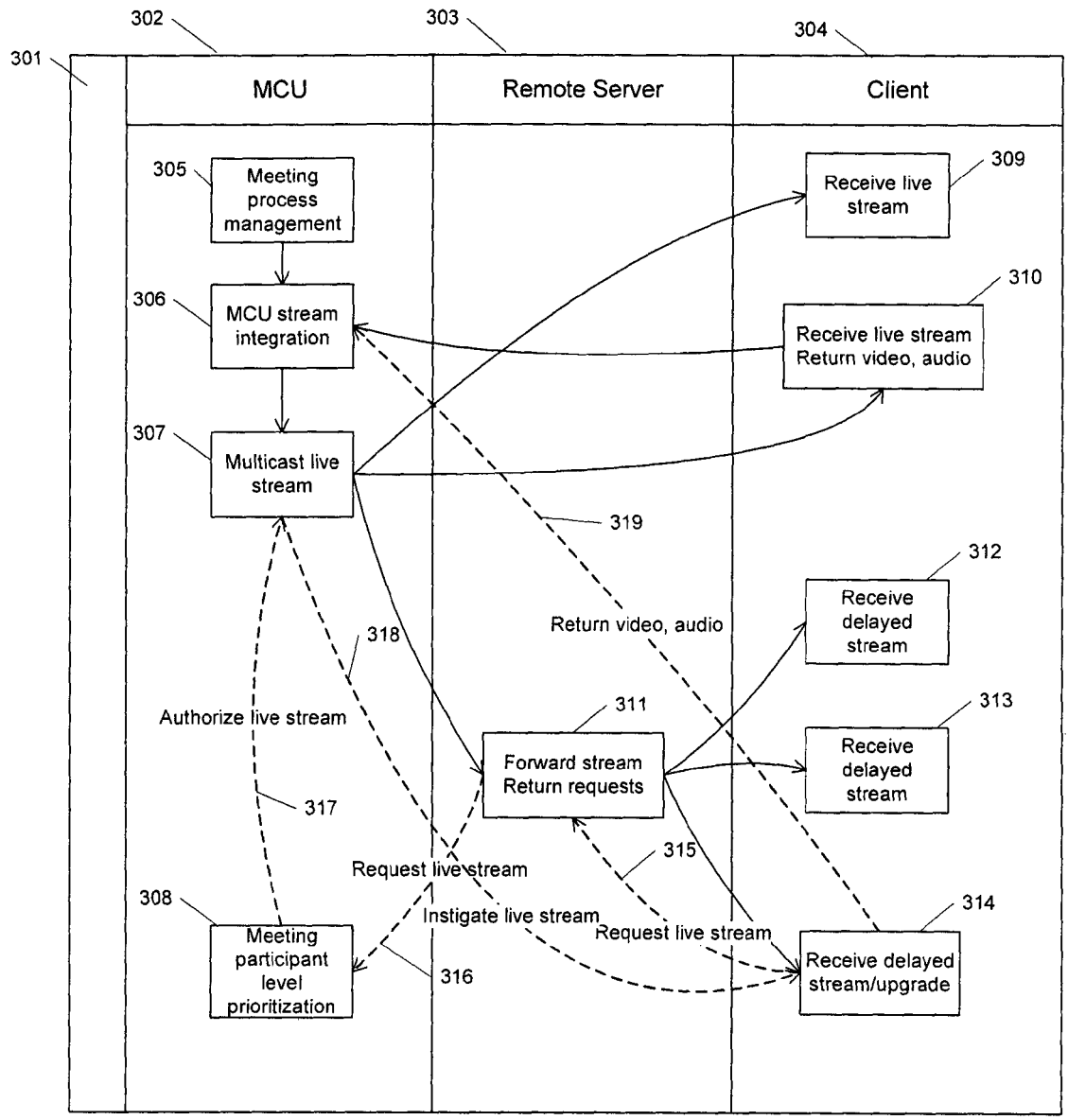
FIG. 3 is a diagram of the process of managing the streaming of a stream to clients.

FIG. 3 shows the manner in which client sessions are served from the MCU or a remote server. The diagram shows at 301 the separation of the stream management into that handled in or around the MCU (302), at a remote server (303) and at a client (304).

At 305 the meeting processes are managed, including such things as the prioritisation of speakers by the moderator, the attachment of documents for download by attendees, the handing off of chat sessions between participants. The various streams from this management process are forwarded to the MCU at 306 for integration into a single stream and then passed to a multicast server at 307. The multicast server issued streams both directly to clients such as 309 and 310 and also to a forwarding server 311 for onward transmission to remote clients 312, 313, 314. These remote clients will be receiving a more delayed version of the stream than the clients who are directly connected, and the delay will vary in dependence on the bandwidth available, the number of transmission hops required to reach the remote server and the quality of service available. Not all the directly connected clients may be fully participating in the meeting, for instance client 309 is merely receiving the stream while client 310 is returning video and audio for integration into the transmitted stream as necessary.

Where a client being serviced through a remote server with a delayed stream wishes to have the ability to take an active part in the meeting the client such as 314 may send through the remote server a request 315 to provide content from the live stream. The remote server forwards this request at 316 to the meeting participant level prioritization module or request receiver 308 which either decides based on a set of rules whether this client is required to participate and therefore requires a live stream and participation access, permitted a live stream but not permitted to participate or not permitted to either participate or receive a live stream, or refers the request to the meeting moderator. Rules may be based on such things as prior requests for access, the live delay to the requestee, the current number of active participants, etc. . . .

Assuming that the request is allowed the MCU stream integration 306 is instructed at 317 to include client 314 in the list for direct connection (and may be instructed to switch another client to a delayed remote server screen) and multicaster 307 targets client 314 at 318. Client 314 will then receive a stream which is in advance of that being currently received, and it may be that the delayed session may continue within a separate window, thus allowing easier switching back to a delayed stream if and when the live stream is terminated.

The request for access to the live stream and access as a participant may be serviced by a single request receiver or may be serviced by separate request receivers for live stream and participation.

Whether a specific person attending the meeting is permitted to become a live attendee or a passive attendee is dependent on the technique used to allow a choice. One method is to provide a method of nominating a person for a live connection and limiting nominations at or near the maximum number of connections available at the MCU. Alternatively the allocations may be by choice of the meeting organizer who may choose, for instance, to provide live connections to all council members where the meeting is a public council meeting. Members of the public would automatically receive passive attendances unless they could provide some reason for presenting to the council, in which case a live attendance could be provided.

A further method may require persons wishing to have the ability to attend the meeting to fill out an online form expressing either their desire to be a live attendee or to accept a role as a passive attendee. In the event of oversubscribing of the number of live attendees the choice might be made on the basis of the time the form was lodged, the number of shares the person holds, the physical location of the person, or any of several other possible choices.

Yet another method of choosing the attendee status would require an initial choice of those people who are presenting to the videoconference as live attendees and then providing on the screens of any passive attendees an option to become a live attendee. This may be done with a "picture in picture" technique in which the forwarded stream appears within a web server interaction screen allowing login and preferences. Should a passive attendee be switched to a live feed the attendee will, of course, lose part of the meeting equivalent to the latency of the remote server serving the forwarded stream. In such a case a small image of the delayed conference may remain upon the originally passive attendees screen preferably together with an indication of the associated latency relative to the live feed.

Participants for a meeting may range from any person who wishes to join the meeting (where the meeting is public) to a limited number of known persons (for instance the board of a company where the meeting is a board meeting). Participants must therefore be known to the system, and a typical user registration process may be followed with verification of the user permissions being required in order to determine which meetings they may be able to view the details of and have access to. In a commercial environment user registration in order to participate in a company meeting may require verification by automatic email from the registration system to a company officer or web mediated moderated confirmation of a registration by a company officer.

Each such participant would have a profile which typically includes their name, position, email, location, and local time, and time and date displays for the participant will show local times for the meeting.

As described the system uses a web browser as the interfacing application. Much of the interaction may rely on JavaScript code to cause a server to provide whatever information is required by a participant. The browser interface may be HTML or it may be a more facile interface such as SWF or Adobe Air™. In the latter case communication between the servers and the client machines may be by RTMP (Real Time Messaging Protocol), hosted for instance on a WebOrb server. Servers 104, which may form part of a virtual server cluster, serve whichever protocol is appropriate to the item in question using the appropriate server.

Equally a specific video application can be provided, running on an operating system such as Windows, Android or Linux to either provide greater security than is available from a browser or to allow facilities not available through a browser, such as native cross-platform operation.

The description assumes that the meeting streams are passed by standard secure TC/PIP protocol, but where, for instance, the meeting is of a large disseminated company the information may be sent via secure tunnels between venues through the internet.

Where the system is interfacing between two different methods (for instance a Java based message being sent to a Flex based recipient) the system provides the correct transformation.

EXAMPLES

While the description relates to the invention in its application to a meeting of a company or similar organisation the invention is equally appropriate to any virtual gathering of persons where some interaction by specific persons in the gathering with one or more presenters, or with the presentation venue, is appropriate. Thus a virtual performance by a string quartet may be controlled by a "moderator/producer" as to the next number to be played, the balance of the instruments or to receive an indication of the amount of "applause" for a particular number. A teacher may expound to a "class" at disparate locations on a specialist subject with feedback from the "pupils" to monitor their understanding of the subject. A pop concert may be directed by the virtual "audience", thus dooming a singer to eternal repeats of the most popular number. A meeting of a council or similar governmental body may extend the meeting as a videoconference to anyone who is interested.

Advantages

The invention allows graduated participation by members of a "live audience" in a group gathering of the "audience" where one or more persons may simultaneously or consecutively participate in what is being presented. It presents the "live audience" to a "moderator" to organise the selection of the presenting member and organisation of any supporting content required by the forthcoming presenter. It presents to both live and "passive" members of the audience the expected or changing order of presentation and may allow individual querying of the attributes of the forthcoming presenter by the live audience and the possibility of opting to upgrade to a "live". audience member to a passive audience member.

Variations

The description relates to a windowed display with an icon bar showing participants across the top, the icons appearing in the bar being limited to those most interactively associated with what is being presented as the main content. The order in which icons appear in the bar may be selected by the viewing participant or may be searched to allow a participant to determine if a specific person is taking part. The icon bar may be shifted at the viewer's option, or varied to have more than a single row of icons.

Selecting an icon may show links to the information which that participant wishes to bring to the conference, and may indicate which have been recently added or which have not yet been accessed by a particular participant.

INDUSTRIAL APPLICABILITY

The video conference management system of the invention is used in the presentation and control of video conferences for business or industry. The present invention is therefore industrially applicable.

The invention claimed is:

1. A videoconference or meeting collaboration system allowing a large number of attendees, having:
    an upstream server or servers providing a live output stream of the meeting proceedings to selected recipients and to one or more first downstream servers;
    a first downstream server or servers providing a delayed replicated stream of the meeting proceedings received from one of the upstream servers;
    separating the online attendees into two classes, (a) those who will actively take part in the meeting or videoconference and who will both receive and provide a video and audio stream via the upstream server or servers, and (b) those who will only receive a video and/or an audio stream via the downstream server or servers; and
    at least one attendee receiving the live stream who is also a participant in creating the live stream via the upstream server or servers.

2. A videoconference or meeting collaboration system allowing a large number of attendees as claimed in claim 1, wherein there are additional downstream server(s) receiving delayed feed from the first downstream server(s) or from other of the downstream servers.

3. A videoconference or meeting collaboration system allowing a large number of attendees as claimed in claim 1, wherein further including:
    an attendee request receiver receiving requests from attendees;
    the request receiver on receiving a request from an attendee receiving a delayed replicated stream providing to the attendee a live stream;
    a live stream request receiver receiving requests from an attendee receiving a live stream and either:
        allowing an attendee receiving a live stream to become a participant in creating the live stream, or
        providing a delayed replicated stream to an attendee and removing any ability of the attendee to participate in creating the live stream.

4. A method of presenting a video conference to remote attendees by:
    providing to at least one remote attendee either a live or a delayed stream of the same video conference content;
    providing to any remote attendee receiving a live stream via an upstream server or servers the ability to participate in providing content for the live stream of the video conference;
    providing to any remote attendee receiving a delayed stream of the video conference via a downstream server or servers the ability to be allocated or request a live stream via the upstream server or servers;
    receiving from an attendee a request to provide a live stream to a remote attendee;
    providing a live stream via the upstream server or servers to such a remote attendee;
    receiving from an attendee a request to provide content for the live stream of the video conference via the upstream server or servers to an attendee receiving the live stream;
    providing the ability to participate in providing content to the live stream via the upstream server or servers to an attendee receiving the live stream as a result of the request to provide content for the live stream.

5. A method as claimed in claim 4 wherein both the live stream and the delayed stream have a latency time from issue to receipt at an attendee and the latency time of the live stream to and from the participants in the live stream is sufficiently low that the progress of the videoconference is not impaired by such participants.

6. A method of presenting a video conference to remote attendees by:
    providing to at least one remote attendee either a live or a delayed stream of the same video conference content;
    providing to any remote attendee receiving a live stream the ability to participate in providing content for the live stream of the video conference;
    providing to any remote attendee receiving a delayed stream of the video conference the ability to be allocated or request a live stream;
    receiving from an attendee a request to provide a live stream to a remote attendee;
    providing a live stream to such a remote attendee; receiving from an attendee a request to provide content for the live stream of the video conference to an attendee receiving the live stream;
    providing the ability to participate in providing content to the live stream to an attendee receiving the live stream as a result of the request to provide content for the live stream:
wherein the signal stream of the videoconference to those remote attendees who are not participating in the live stream is replicated through at least one stream server remote from the live stream server for transmission to those remote attendees.

7. A method as claimed in claim 6 wherein the signal stream from a remote stream server is forwarded to at least one other stream server for transmission to further remote attendees.

8. A method of presenting a video conference to remote attendees by:
    providing to at least one remote attendee either a live or a delayed stream of the same video conference content;
    providing to any remote attendee receiving a live stream the ability to participate in providing content for the live stream of the video conference;

providing to any remote attendee receiving a delayed stream of the video conference the ability to be allocated or request a live stream;

receiving from an attendee a request to provide a live stream to a remote attendee;

providing a live stream to such a remote attendee;

receiving from an attendee a request to provide content for the live stream of the video conference to an attendee receiving the live stream;

providing the ability to participate in providing content to the live stream to an attendee receiving the live stream as a result of the request to provide content for the live stream;

wherein at each stream server the delayed signal stream is cumulated for a time sufficient to ensure receipt of a sequential portion of the stream before the portion of the stream is again forwarded.

9. A method as claimed in claim 4 wherein an attendee participating in a live stream may be removed from a live stream and connected to a delayed stream.

10. A method of presenting a video conference to remote attendees by:

providing to at least one remote attendee either a live or a delayed stream of the same video conference content;

providing to any remote attendee receiving a live stream the ability to participate in providing content for the live stream of the video conference;

providing to any remote attendee receiving a delayed stream of the video conference the ability to be allocated or request a live stream;

receiving from an attendee a request to provide a live stream to a remote attendee;

providing a live stream to such a remote attendee;

receiving from an attendee a request to provide content for the live stream of the video conference to an attendee receiving the live stream;

providing the ability to participate in providing content to the live stream to an attendee receiving the live stream as a result of the request to provide content for the live stream;

wherein an attendee receiving a delayed stream may signal to a videoconference moderator by means outside the live stream a desire to participate in the live stream.

11. A videoconference or meeting collaboration system having:

a server or servers providing a live output stream of the meeting proceedings;

a server or servers providing a delayed replicated stream of the meeting proceedings;

attendees receiving at least one of the streams;

at least one attendee receiving the live stream who is also a participant in creating the live stream;

an attendee request receiver receiving requests from attendees;

the request receiver, on receiving a request from an attendee receiving a delayed replicated stream via a server providing a delayed replicated stream, providing to the attendee a live stream via a server providing a live stream;

a live stream request receiver receiving requests from an attendee receiving a live stream and either:

allowing an attendee receiving a live stream to become a participant in creating the live stream, or providing a delayed replicated stream via a server providing a delayed replicated stream to an attendee and removing any ability of the attendee to participate in creating the live stream.

12. A videoconference or meeting collaboration system having:

a server or servers providing a live output stream of the meeting proceedings;

a server or servers providing a delayed duplicated stream of the meeting proceedings;

attendees receiving at least one of the streams;

attendees receiving at least one of the streams;

at least one attendee receiving the live stream who is also a participant in creating the live stream;

an attendee request receiver receiving requests from attendees;

the request receiver on receiving a request from an attendee receiving a delayed replicated stream providing to the attendee a live stream;

a live stream request receiver receiving requests from an attendee receiving a live stream and either:

allowing an attendee receiving a live stream to become a participant in creating the live stream, or providing a delayed replicated stream to an attendee and removing any ability of the attendee to participate in creating the live stream;

wherein a delayed replicated stream is provided to a server to provide a further delayed replicated stream.

13. A videoconference or meeting collaboration system as claimed in claim 11 wherein the attendee request receiver processes a request from an attendee to become a participant in accord with a set of rules.

* * * * *